Aug. 14, 1928.
F. D. DAVIS
1,680,596
FISHING TOOL FOR OIL WELLS
Filed May 23, 1927
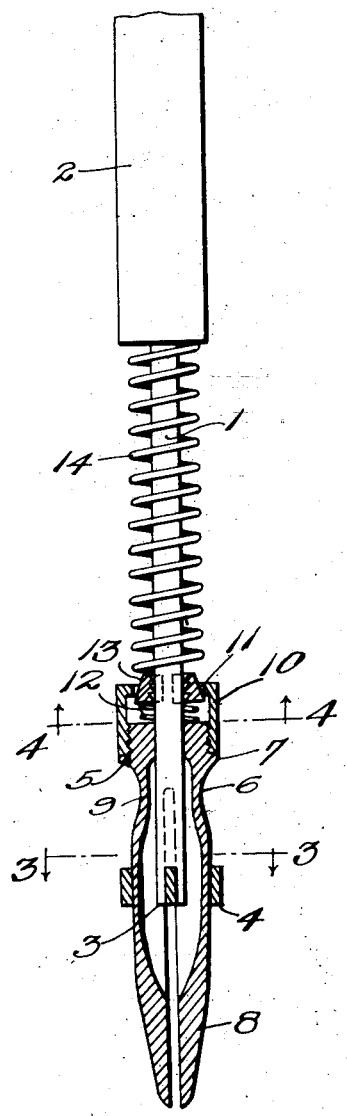
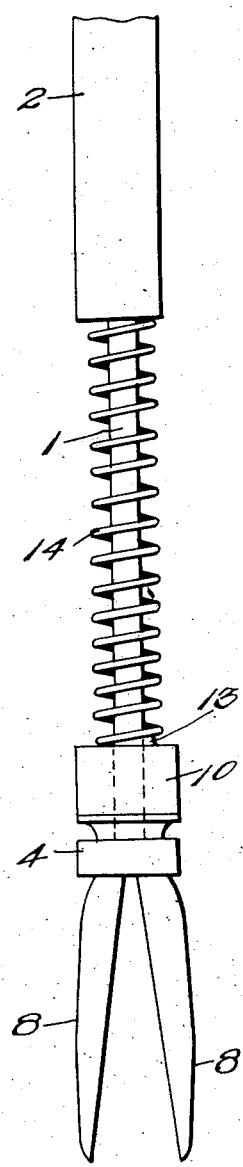
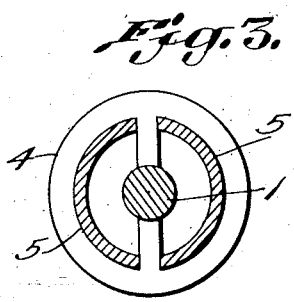
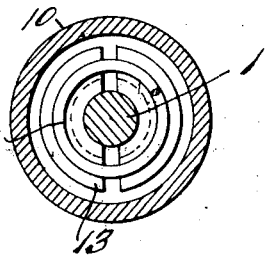
Inventor
F. D. Davis
By (signature)
Atty.

Patented Aug. 14, 1928.

1,680,596

UNITED STATES PATENT OFFICE.

FRED D. DAVIS, OF DUNCAN, OKLAHOMA.

FISHING TOOL FOR OIL WELLS.

Application filed May 23, 1927. Serial No. 193,585.

My present invention pertains to fishing tools for use in conjunction with oil wells; and it contemplates the provision of a peculiar and advantageous fishing tool designed more especially for taking hold of and raising lugs or pieces of iron or any other objects that may fall in an oil well hole.

To the attainment of the foregoing the invention consists in the improvement as hereinafter described and definitely claimed.

In the accompanying drawing forming part of this specification:—

Figure 1 is a view partly in elevation and partly in diametrical section of the fishing tool constituting the preferred embodiment of the invention.

Figure 2 is a side elevation showing the tool in open state.

Figure 3 is a cross section taken on the plane indicated by the line 3—3 of Figure 1, looking downwardly.

Figure 4 is a cross section taken in the plane indicated by the line 4—4 of Figure 1, looking upwardly.

Similar numerals of reference designate corresponding parts in all the views of the drawing.

Among other elements my novel tool comprises a mandrel including a stem 1 and a stub 2 fixed to the upper end of the stem 1. At its lower end, the stem 1 is joined by a fixed diametrical bar 3 to an annulus 4, said bar 3 and annulus 4 being fixed with respect to the said stem 1.

Loosely surrounding the stem 1 of the mandrel is the head 5 of a gripping device 6, formed by preference of spring steel and flanged at 7. In addition to the head 5, the gripping device includes jaws 8 which tend to spring away from each other after the manner illustrated in Figure 2.

The said jaws 8 are arranged loosely within the annulus 4, and intermediate of the jaws 8 and the head 5 is a neck portion 9. When the annulus 4 is in the position shown in Figure 1 the jaws 8 will be strongly held in closed position, while when the annulus 4 is positioned about the neck 9 as shown in Figure 2, the jaws 8 will be permitted to assume and rest in the open position shown in Figure 2.

A casing member 10 is threadedly connected to the head 5 and is flanged as designated by 11, and arranged in the said casing member 10 and about the stem 1 of the mandrel is a coiled expansion spring 12.

Superposed on the spring 12 and arranged at opposite sides of the stem 1 are dogs 13 with teeth opposed to the stem 1 and disposed as best shown in Figure 1, and surrounding the stem 1 and interposed between the dogs 13 and the stub 2 is a coiled expansion spring 14.

The dogs 13 are adapted to catch where they stop on the stem 1 of the mandrel.

It will be gathered from the foregoing that the stem 1 and the annulus 4 are connected together as one piece. Therefore when the jaws 8 reach the bottom, the weight of the tool will be placed on the stem 1 and annulus 4. This brings about downward movement of the annulus 4 on the jaws 8 and causes the jaws to take a friction hold. It will also be noted that the dogs 13 will make a slip hold on the stem 1. In fishing, when a friction hold is attained, and the tool comes up to the pipe, if the object fished for comes up to the pipe and is not in line or is one side, the friction hold cannot hold under much strain, but the dogs 13 render it difficult for the object to get away. When the tool is closed, as in Figure 1, all of its elements are fixed with respect to each other and are adapted to move as a unit. When it is off of bottom the spring 14 serves to prevent the tool from setting while going into the hole.

It will be apparent from the foregoing that my novel finishing tool is well adapted for the purpose for which it is designed, and that it is generally well adapted to withstand the usage to which oil well tools and appurtenances are ordinarily subjected.

I have specifically described the preferred embodiment of my invention in order to impart a full, clear, and exact understanding of the said embodiment. I do not desire, however, to be understood as limiting myself to the precise construction disclosed, my invention being defined by my appended claims within the scope of which modifications may be made without departure from my invention.

Having thus described the invention, what I claim as new is:—

1. In a fishing tool, and in combination, a mandrel stem equipped at its lower end with an annulus and provided in spaced relation above the annulus with an abutment, spring jaws carried by and pendent from a head loose on the mandrel stem and disposed within said annulus, a flanged casing member carried on said head, upwardly tapered dogs arranged at opposite sides of the mandrel stem and in said casing member and between the flange thereof and the stem, a coiled expansion spring surrounding the stem and interposed between the head and said dogs, and a second coiled expansion spring surrounding the stem and interposed between the dogs and the said abutment on the stem.

2. A fishing tool comprising spring jaws carried by an apertured head, a stem loose in the aperture of the head and having an annulus surrounding the jaws, dogs arranged to engage the stem and located above said head and connected with and movable relative to said head, and spring means complementary to said dogs.

3. A fishing tool comprising spring jaws, means on which said jaws are movable rectilinearly, said means equipped with a jaw closer, means complementary to the jaws and connected with and movable relative to the jaws for clutching the first named means, and spring means complementary to the clutching means.

In testimony whereof I affix my signature.

FRED D. DAVIS.